2,878,241

POLYMERIZATION OF ETHYLENE WITH AN ALUMINUM HALIDE AND A METAL OXIDE AS CATALYST

Abraham Schneider, Overbrook Hills, Pa., assignor to Sun Oil Company, Philadelphia, Pa., a corporation of New Jersey No Drawing. Application June 21, 1956
Serial No. 592,756

8 Claims. (Cl. 260—94.9)

This invention relates to a process for the polymerization of olefins and more particularly relates to a process for the preparation of solid polymers of ethylene.

An object of the present invention is to provide a relatively low temperature, low pressure process for polymerizing ethylene to polymers that are solid under normal conditions, such solid polymers being herein designated "polyethylene" for convenience. Another object is to provide a reaction medium effective for the polymerization of ethylene which is simple and inexpensive to prepare and which produces improved yields of polyethylene. Other objects and their achievement in accordance with the invention will be apparent hereinafter.

It has now been found that by contacting, under polymerizing conditions, ethylene in a liquid, inert hydrocarbon reaction medium with a catalytic composition consisting essentially of an aluminum halide and the oxide of a metal of group VIa of the periodic table in which the metal is in its highest valence state, or with vanadium oxide or manganese oxide, as hereinafter described, the ethylene is rapidly converted to polyethylene in high yield.

In an embodiment of the invention, a slurry of aluminum chloride and chromium trioxide in isooctane is prepared. Ethylene is introduced into the slurry under polymerizing conditions while agitating the reaction mixture. Polyethylene is rapidly formed and can be separated from the reaction mixture by any convenient means.

The process of the invention is directed to the polymerization of ethylene and it is preferred that the ethylene be relatively pure. However, minor quantities of other materials, such as methane, ethane, and propane can be present without deleteriously affecting the reaction. Other olefins, such as propylene, butene-1, butene-2, butadiene and the like can be present in quantities up to about 25% by weight of the ethylene charged and good results obtained.

The catalyst of the invention includes as a component an oxide from group VIa of the periodic table, namely, an oxide of chromium, molybdenum or tungsten, or an oxide of vanadium or manganese. It is essential that the metal of the oxide be in its highest valence state when the metal is from group VIa or is vanadium, i. e., that the oxide have the formula of $MO_3$ wherein M is chromium, molybdenum or tungstein, or $V_2O_5$ wherein the metal is vanadium. When the metal is manganese, the oxide used is $Mn_2O_7$. The trioxides of chromium, molybdenum and tungsten are the preferred oxides of the invention. It is preferred that the metal oxide be deposited on an inert carrier such as kieselguhr, diatomite, alumina, silica, synthetic mixtures of silica and alumina, various clays, or the like. As above stated, good results are obtained by mixing aluminum chloride with a metal oxide deposited on a solid carrier in an inert hydrocarbon medium, and introducing ethylene into the resulting catalyst slurry under polymerizing conditions. Aluminum chloride is the preferred aluminum halide to use, but aluminum bromide can be used with good results, especially where the catalyst is used as a slurry. Ethylene may be introduced into the reaction mixture as a gas or as a solution in an inert hydrocarbon which is preferably the same hydrocarbon used in preparing the catalyst slurry. If desired, a solid catalytic composition can be prepared and used in fixed bed or moving bed operations. A solid catalyst in accordance with the invention contains both the metal oxide and aluminum chloride, and is advantageously prepared by depositiing the metal oxide on an inert carrier and contacting the impregnated composition with the vapors of aluminum chloride.

The concentrations of the catalytic components can be varied widely and good results obtained. The ratio of aluminum halide to metal oxide is preferably maintained within the mole ratio of 0.1:1 to 10:1. When a carrier is employed, from 1 to 40 parts of metal oxide is advantageously deposited on 100 parts of the carrier material.

The process of the invention is preferably operated at relatively low temperatures and pressures. Temperatures of from 20° C. to 250° C. and preferably from 50° C. to 150° C. give good results. The pressure employed must be sufficient to maintain the hydrocarbon reaction medium in the liquid phase, and preferably is within the range of from atmospheric to 1000 p. s. i. g. (pounds per square inch gauge).

When the process of the invention is operated as a slurry type operation, the volume ratio of catalyst to solvent can be varied substantially and good results obtained. Volume ratios of catalyst to solvent of from 1:1 to 1:100 give good results. When fixed bed type operation is employed, it is preferred to pass a solution of ethylene in a hydrocarbon reaction medium through the bed at a space rate of from 0.1 to 10 v./v./hour (volumes of hydrocarbon per volume of catalyst per hour). The ethylene concentration in the solvent can vary from about 0.5% to 40% by weight. An advantage of the process is that good results are obtained with low concentrations of ethylene, say from 0.5% to 2% by weight. However, higher concentrations, say from 5% to 15%, are preferred.

Solvents which can be employed as the inert reaction medium of the process of the invention are saturated hydrocarbons including paraffins, such as n-butane, the hexanes, the octanes, mixtures thereof and the like, and cycloparaffins, such as cyclopentane, alkyl substituted cyclopentanes, cyclohexanes, alkyl substituted cyclohexanes, Decalin, mixtures thereof and the like.

After the polymerization reaction has proceeded to the desired extent, the solvent containing polyethylene, which may be dissolved, suspended, or both dissolved and suspended, is separated from the catalyst. Dissolved polymers can be recovered, together with suspended polymers by cooling the solvent to precipitate the dissolved polymers and filtering. Other means of recovery such as evaporating the hydrocarbon solvent from the polyethylene can be used with good results.

Polyethylene prepared in accordance with the process of the invention can vary from soft, grease-like solids having molecular weights of about 300 to tough, resinous polymers having molecular weights of over 300,000, the type of polymer prepared being determined by the particular catalytic composition used and the reaction conditions employed. For example, use of relatively low pressures and high temperatures results in relatively low molecular weight polymers, whereas use of relatively high pressures and low temperatures results in relatively high molecular weight polymers.

Polyethylene prepared in accordance with the process of the invention is useful for many purposes. For example, polyethylene formed into thin films is useful for wrapping food products. The tougher polyethylene products are useful for preparing pipes for transporting liquids, for containers for stirring corrosive liquids and the like. Such articles can be prepared by extrusion, molding or other fabricating processes.

In order to illustrate an embodiment of the invention, aluminum chloride and chromium trioxide are slurried in normal octane, 5 parts of aluminum chloride being used to 1 part of chromium trioxide, "parts" as used herein being parts by weight. The volume ratio of aluminum chloride and chromium trioxide to octane is 1:50. With the temperature of the catalyst slurry adjusted to 125° C., ethylene in gas phase is bubbled into the slurry with agitation. Sufficient ethylene is added to obtain a pressure of about 400 p. s. i. g. Periodic addition of ethylene to maintain the pressure at 400 p. s. i. g. is performed over a period of about 4 hours, continuous agitation being maintained. Octane containing dissolved polymers of ethylene is separated from the catalyst by decanting and cooled to precipitate dissolved polyethylene. The precipitated polyethylene is separated by filtration and is recovered as a white solid having a molecular weight of about 20,000, substantially all of the ethylene reacting being recovered as solid polymer.

In order to illustrate another embodiment of the invention, alumina particles are impregnated with an aqueous solution of chromium trioxide. The impregnated composition is dried and heated at 500° C. for 4 hours in contact with air. The concentration of chromium trioxide in the aqueous solution and the quantity of aqueous solution used for the impregnation are adjusted so that the final catalytic composition contains 5% by weight chromium trioxide. The chromium trioxide-alumina composition is then contacted with aluminum chloride vapors so that aluminum chloride is deposited thereon. The contacting is continued until the composition contains about 2% by weight aluminum chloride. The resulting composition is introduced into a reactor and normal hexane containing about 3% by weight ethylene passed through the reactor at a space rate of 3 v./v./hour, a temperature of 150° C. and a pressure of 500 p. s. i. g. The effluent is cooled to about 20° C. to precipitate dissolved polyethylene. The precipitated polyethylene is filtered and dried. The recovered product is a white, finely divided solid having a molecular weight of about 20,000.

When other catalysts and reaction conditions are used within the limits herein defined, substantially equivalent results are obtained.

The invention claimed is:

1. Process for preparing solid polymers of ethylene which comprises contacting, at a tempertaure of from 20° C. to 250° C. and a pressure of from atmospheric to 1000 p. s. i. g., ethylene dissolved in an inert, liquid saturated hydrocarbon reaction medium with a catalytic composition consisting essentially of an aluminum halide and a material selected from the group consisting of chromium trioxide, molybdenum trioxide, tungsten trioxide, vanadium pentoxide and manganese heptoxide.

2. Process for preparing solid polymers of ethylene which comprises forming a catalytic reaction mixture by admixing aluminum chloride and a metal oxide selected from the group consisting of chromium trioxide, molybdenum trioxide, tungsten trioxide, vanadium pentoxide and manganese heptoxide in an inert, liquid saturated hydrocarbon reaction medium, and introducing ethylene to the reaction mixture while maintaining the temperature of the reaction mixture within the range of from 20° C. to 250° C. and the pressure within the range of from atmospheric to 1000 p. s. i. g., the pressure being sufficient to maintain the saturated hydrocarbon reaction medium in the liquid phase, and recovering solid polymers of ethylene from the reaction medium.

3. Process according to claim 2 wherein the metal oxide selected is chromium trioxide.

4. Process according to claim 2 wherein the metal oxide selected is molybdenum trioxide.

5. Process according to claim 2 wherein the metal oxide selected is tungsten trioxide.

6. Process according to claim 2 wherein the metal oxide selected is vanadium pentoxide.

7. Process according to claim 2 wherein the metal oxide selected is manganese heptoxide.

8. Process for preparing solid polymers of ethylene which comprises contacting ethylene dissolved in an inert, liquid saturated hydrocarbon reaction medium with a solid catalystic composition consisting essentially of an inert carrier having deposited thereon from 1 to 40 parts of a metal oxide selected from the group consisting of chromium trioxide, molybdenum trioxide, tungsten trioxide, vanadium pentoxide and manganese heptoxide per 100 parts of carrier and a quantity of aluminum chloride so that the mole ratio of aluminum chloride to metal oxide is from 0.1:1 to 10:1, said contacting being performed at a temperature of from 20° C. to 250° C. and a pressure within the range of from atmospheric to 1,000 p. s. i. g., the pressure being sufficient to maintain said saturated hydrocarbon reaction medium in the liquid phase.

References Cited in the file of this patent
UNITED STATES PATENTS

| | | |
|---|---|---|
| 2,404,788 | Burk et al. | July 30, 1946 |
| 2,533,058 | Schaffer et al. | Dec. 5, 1950 |
| 2,581,154 | Walsh et al. | Jan. 1, 1952 |
| 2,637,720 | Schneider et al. | May 5, 1953 |